(12) United States Patent
Abeygunawardana et al.

(10) Patent No.: US 11,825,981 B2
(45) Date of Patent: Nov. 28, 2023

(54) SINGLE SERVE BEVERAGE DISPENSER FOR AN APPLIANCE

(71) Applicant: Haier US Appliance Solutions, Inc., Wilmington, DE (US)

(72) Inventors: Danister Abeygunawardana, Jeffersonville, IN (US); Jianwu Li, Louisville, KY (US); Gregory Scott Carr, Louisville, KY (US); Brent Alden Junge, Evansville, IN (US); Michael C. Watanabe, Louisville, KY (US); Richard Devos, Goshen, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 583 days.

(21) Appl. No.: 17/024,907

(22) Filed: Sep. 18, 2020

(65) Prior Publication Data
US 2022/0087468 A1    Mar. 24, 2022

(51) Int. Cl.
| | |
|---|---|
| *A47J 31/40* | (2006.01) |
| *A47J 31/06* | (2006.01) |
| *A47J 31/44* | (2006.01) |
| *A47J 31/36* | (2006.01) |
| *F25D 23/12* | (2006.01) |

(52) U.S. Cl.
CPC ......... *A47J 31/407* (2013.01); *A47J 31/0642* (2013.01); *A47J 31/0668* (2013.01); *A47J 31/0689* (2013.01); *A47J 31/3676* (2013.01); *A47J 31/40* (2013.01); *A47J 31/4407* (2013.01); *F25D 23/126* (2013.01)

(58) Field of Classification Search
CPC .. A47J 31/407; A47J 31/0642; A47J 31/0668; A47J 31/0689; A47J 31/3676; A47J 31/40; A47J 31/4407
USPC .......................................................... 99/295
See application file for complete search history.

(56) References Cited

U.S. PATENT DOCUMENTS

| | | | |
|---|---|---|---|
| 9,675,202 B2 | 6/2017 | Bonacci | |
| 10,342,377 B2 | 7/2019 | Cable | |
| 10,485,372 B2 | 11/2019 | Bruinsma | |
| 2016/0107831 A1* | 4/2016 | Talon | A47J 31/407 426/115 |
| 2016/0367069 A1* | 12/2016 | Cable | A47J 31/446 |
| 2017/0252990 A1* | 9/2017 | Schultz | A47J 31/4492 |
| 2022/0071437 A1* | 3/2022 | Tseng | A47J 31/4492 |
| 2022/0240712 A1* | 8/2022 | Chernov | A47J 31/469 |
| 2022/0369852 A1* | 11/2022 | Abeygunawardana | A47J 31/468 |

* cited by examiner

*Primary Examiner* — Omar Flores Sanchez
(74) *Attorney, Agent, or Firm* — Dority & Manning, P.A.

(57) ABSTRACT

A beverage dispensing assembly may include a brewing body and a lid, as well as a contact pin or dispersion head. The brewing body may define a brew chamber to receive a brew pod. The brewing body may extend along the rotation axis between an upper end and a lower end. The brewing body may define an outlet at the lower end. The lid may be rotatably attached to the brewing body at the upper end to rotate about the rotation axis between a first position and a second position. The first position may secure the lid to the brewing body and restrict access to the brew chamber. The second position may release the lid from the brewing body.

18 Claims, 15 Drawing Sheets

SINGLE SERVE BEVERAGE DISPENSER FOR AN APPLIANCE

FIELD OF THE INVENTION

The present subject matter relates generally to single serve beverage dispensers, and more particularly to single serve beverage dispensers for use in domestic appliances.

BACKGROUND OF THE INVENTION

Recently, popularity for appliances capable of generating single serve (e.g., hot) beverages has increased. These beverages (e.g., coffee or tea) may be generated using heated liquid water provided to and through a dispenser of the appliance. Such dispensers generally use brew modules that can receive a single serve brew pod or cup holding a particulate (e.g., coffee grounds, tea leaves, etc.) for a desired beverage. Such brew pods may be prepacked (e.g., by a manufacturer as a disposable unit) or filled by an end user (e.g., as a reusable unit or cup). Conventional brew modules include a brew chamber that holds a brew pod therein. A lower needle may be positioned in the bottom of the brew chamber and a stationary upper needle may extend from a lid which is pivotally attached to the brew module. Each needle defines holes through which liquid may flow. Closing the lid causes the lid to push down the brew pod while upper and lower needles to pierce the top and bottom of the brew pod, respectively, such that water may flow through the brew pod to create the beverage which is dispensed to the user.

In conventional systems, difficulties may arise when trying properly place a brew pod within or to remove a brew pod from the brew chamber. For instance, it can be difficult to ensure proper insertion of a brew without relying on complex electronic systems or risking damage to the brew module. Additionally or alternatively, once inserted, it can be difficult for a user to reach or access the brew pod. In some such systems, only a small portion of a lip or rim on the brew pod may be accessible. Moreover, if a needle has pierced the brew pod, a friction or interference fit may be formed between the needle and the brew pod. The interference fit may restrict or hinder movement of the brew pod from the brew chamber, for instance, in a vertical direction.

Additionally or alternatively, difficulties may arise in conventional system when attempting to clean the brew module. In particular, the brew chamber may become dirty over time as particulate or residue may accumulate within the brew chamber. Nonetheless, many brew modules are permanently affixed to the appliance. Even brew modules that are not fixed to the appliance may be difficult to adequately clean since, for instance, smaller crevices or needles may be hard for a user to access (e.g., for practical reasons, safety concerns, etc.).

Accordingly, a domestic appliance that includes improved features for dispensing single serve beverages would be useful. For instance, single serve beverage dispensing assemblies for appliances that improve access to the brew pod would be useful. Additionally or alternatively, single serve beverage assemblies for appliances that may be readily removed, cleaned, or reinstalled would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a beverage dispensing assembly is provided. The beverage dispensing assembly may include a brewing body, a lid, a rail, and a contact pin. The brewing body may define a brew chamber to receive a brew pod. The brewing body may extend along the rotation axis between an upper end and a lower end. The brewing body may define an outlet at the lower end. The lid may be rotatably attached to the brewing body at the upper end to rotate about the rotation axis between a first position and a second position. The first position may secure the lid to the brewing body and restrict access to the brew chamber. The second position may release the lid from the brewing body. The rail may be disposed on the lid to support the beverage dispensing assembly on the appliance. The rail may define a slide path along which the beverage dispensing assembly may slide along the appliance. The contact pin may selectively extend through the slide path in the second position to prevent attachment of the beverage dispensing assembly to the appliance.

In another exemplary aspect of the present disclosure, a beverage dispensing assembly is provided. The beverage dispensing assembly may include the brewing body, the lid, and a distributor plate. The brewing body may define a brew chamber to receive a brew pod. The brewing body may extend along the rotation axis between an upper end and a lower end. The brewing body may define an outlet at the lower end. The lid may define an inlet to receive a water conduit. The lid may be rotatably attached to the brewing body at the upper end to rotate about the rotation axis between a first position and a second position. The first position may secure the lid to the brewing body and restrict access to the brew chamber. The second position may release the lid from the brewing body. The distributor plate may be disposed between the inlet and the brew chamber. The distributor plate may define a plurality of apertures to permit water to the brew chamber. The distributor plate may include a dispersion head and a base platform. The dispersion head may be disposed above the base platform to deflect water from the water conduit to the base platform. The base platform may define a plurality of radially spaced apertures to permit water from the dispersion head to the brew chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
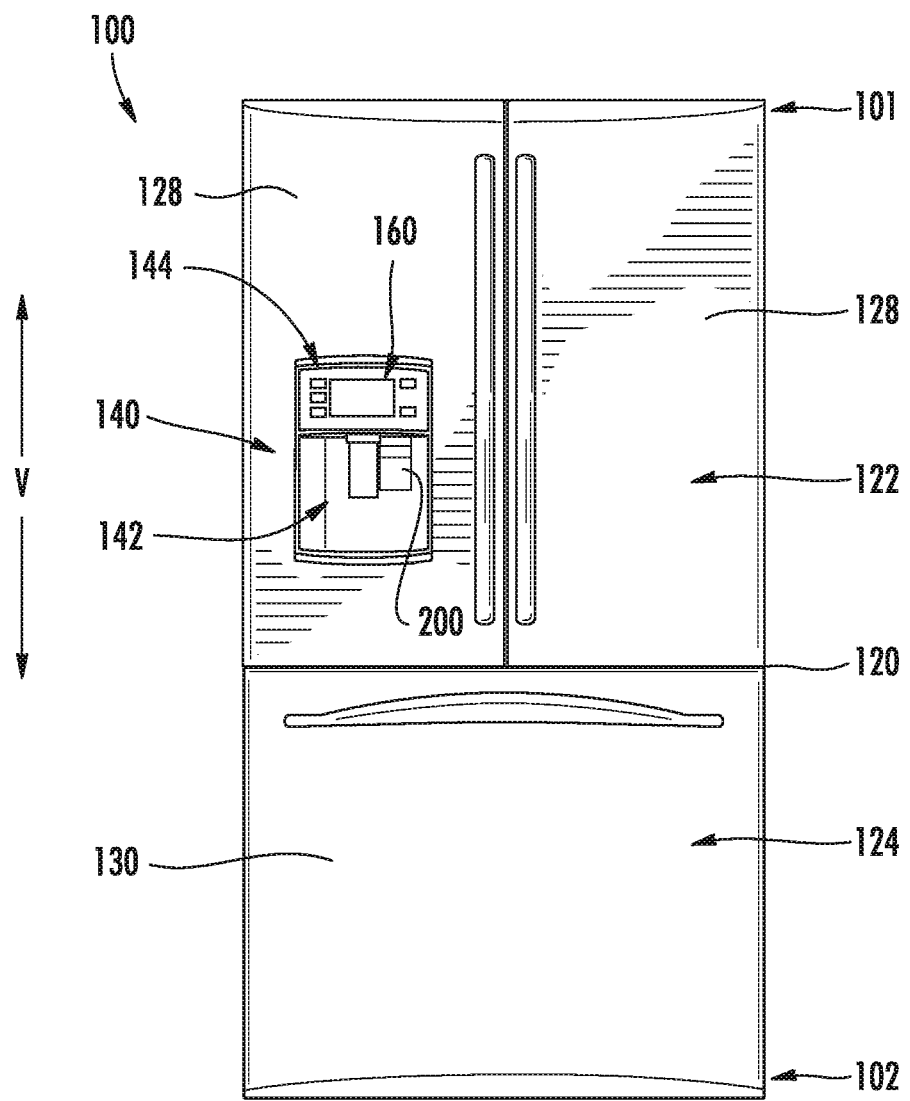
FIG. 1 provides a front, elevation view of a refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning now to the figures, FIG. 1 provides a front, elevation view of a domestic appliance, according to an example embodiment of the present subject matter. Specifically, FIG. 1 illustrates a domestic appliance that is a refrigerator appliance 100. Refrigerator appliance 100 includes a cabinet or housing 120. Housing 120 extends between an upper portion 101 and a lower portion 102 along a vertical direction V. Housing 120 defines chilled chambers, e.g., a fresh food compartment 122 positioned adjacent upper portion 101 of housing 120 and a freezer compartment 124 arranged at lower portion 102 of housing 120. Housing 120 also defines a mechanical compartment (not shown) for receipt of a sealed cooling system for cooling fresh food compartment 122 and freezer compartment 124.

Refrigerator appliance 100 is generally referred to as a bottom-mount refrigerator appliance. However, it should be understood that refrigerator appliance 100 is provided by way of example only. Thus, the present subject matter is not limited to refrigerator appliance 100 and may be utilized in any suitable domestic appliance having a beverage dispenser. For example, one of skill in the art will understand that the present subject matter may be used with side-by-side style refrigerator appliances or top-mount refrigerator appliances, as well as stand-alone beverage or brewing appliances.

Refrigerator doors 128 are rotatably hinged to housing 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Figure 2:
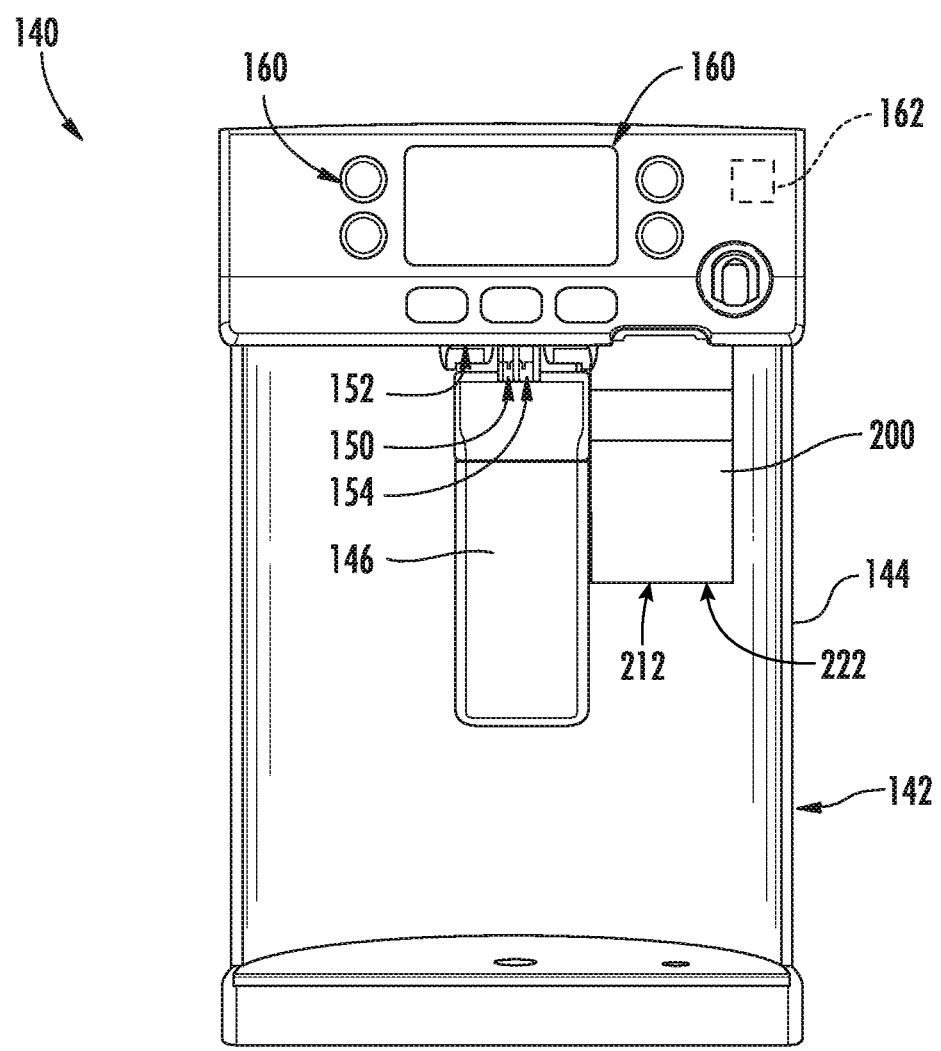
FIG. 2 provides a front, elevation view of a dispensing assembly of the exemplary refrigerator appliance of FIG. 1.

As shown in FIGS. 1 and 2, refrigerator appliance 100 may also include a dispensing assembly 140 for dispensing various fluids, such as liquid water and/or ice, to a dispenser recess 142 defined on one of refrigerator doors 128. In some embodiments, dispensing assembly 140 includes a dispenser 144 positioned on an exterior portion of refrigerator appliance 100, for example, within dispenser recess 142. Dispenser 144 includes several outlets for accessing ice, chilled liquid water, and heated liquid water. In order to access ice, chilled liquid water, and heated liquid water; water-dispensing assembly 140 may, for example, include a paddle 146 mounted below a chilled water outlet 150, an ice outlet 152, and a heated water outlet 154.

During operation of dispensing assembly 140, a user may urge a vessel, such as a cup, against paddle 146 to initiate a flow of chilled liquid water, heated liquid water and/or ice into the vessel within dispenser recess 142. In particular, a control panel or user interface panel 160 may be provided for controlling the mode of operation of dispenser 144, e.g., for selecting chilled liquid water, heated liquid water, crushed ice, and/or whole ice. User interface panel 160 may include a chilled water dispensing button (not labeled), an ice-dispensing button (not labeled) and a heated water dispensing button (not labeled) for selecting between chilled liquid water, ice, and heated liquid water, respectively. User interface panel 160 may also include a display component, such as a digital or analog display device designed to provide operational feedback to the user.

Outlets 150, 152, 154 and paddle 146 may comprise an external part of dispenser 144 positioned at or adjacent dispenser recess 142, e.g., a concave portion defined in an outside surface of refrigerator door 128. Dispenser 144 is positioned at a predetermined elevation convenient for a user to access ice or liquid water, e.g., enabling the user to access ice without the need to bend-over and without the need to access freezer compartment 124. In the example embodiment, dispenser 144 is positioned at a level that approximates the chest level of a user.

Operation of the refrigerator appliance 100 can be regulated by a controller 162 that is operatively coupled to user interface panel 160 and/or various sensors as discussed below. User interface panel 160 provides selections for user manipulation of the operation of refrigerator appliance 100 such as, for example, selections between whole or crushed ice, chilled water, and other various options. In response to user manipulation of the user interface panel 160 or sensor signals, controller 162 may operate various components of the refrigerator appliance 100. Controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 162 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 162 may be positioned in a variety of locations throughout refrigerator appliance 100. In the illustrated embodiment, controller 162 is located within the user interface panel 160. In other embodiments, the controller 162 is positioned at any suitable location within refrigerator appliance 100, such as for example within a fresh food chamber, a freezer door, etc. Input/output ("I/O") signals may be routed between controller 162 and various operational components of refrigerator appliance 100. For example, user interface panel 160 may be in communication with controller 162 via one or more signal lines or shared communication busses.

As illustrated, controller 162 may be in communication with the various components of dispensing assembly 140 and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

In certain embodiments, refrigerator appliance 100 also includes features for generating heated liquid water and directing such heated liquid water to dispenser 144. Refrigerator appliance 100 need not be connected to a residential hot water heating system in order to supply heated liquid water to dispenser 144. As would be understood, a water heating assembly may be provided and include, for example, a variety of water supplies, hot water tanks, heating elements, temperature sensors, and control valves to heat water from a well or municipal water supply, store the heated water, and supply the heated water to dispenser 144.

Dispensing assembly 140 is optionally capable of providing heated water at various temperatures depending on the type of beverage being brewed. For example, when brewing ground coffee, water for brewing may be heated to between one hundred eighty degrees Fahrenheit and one hundred ninety degrees Fahrenheit. Additionally or alternatively, dispensing assembly 140 may be adjusted to provide water for making beverages at any suitable temperature.

Figure 16:
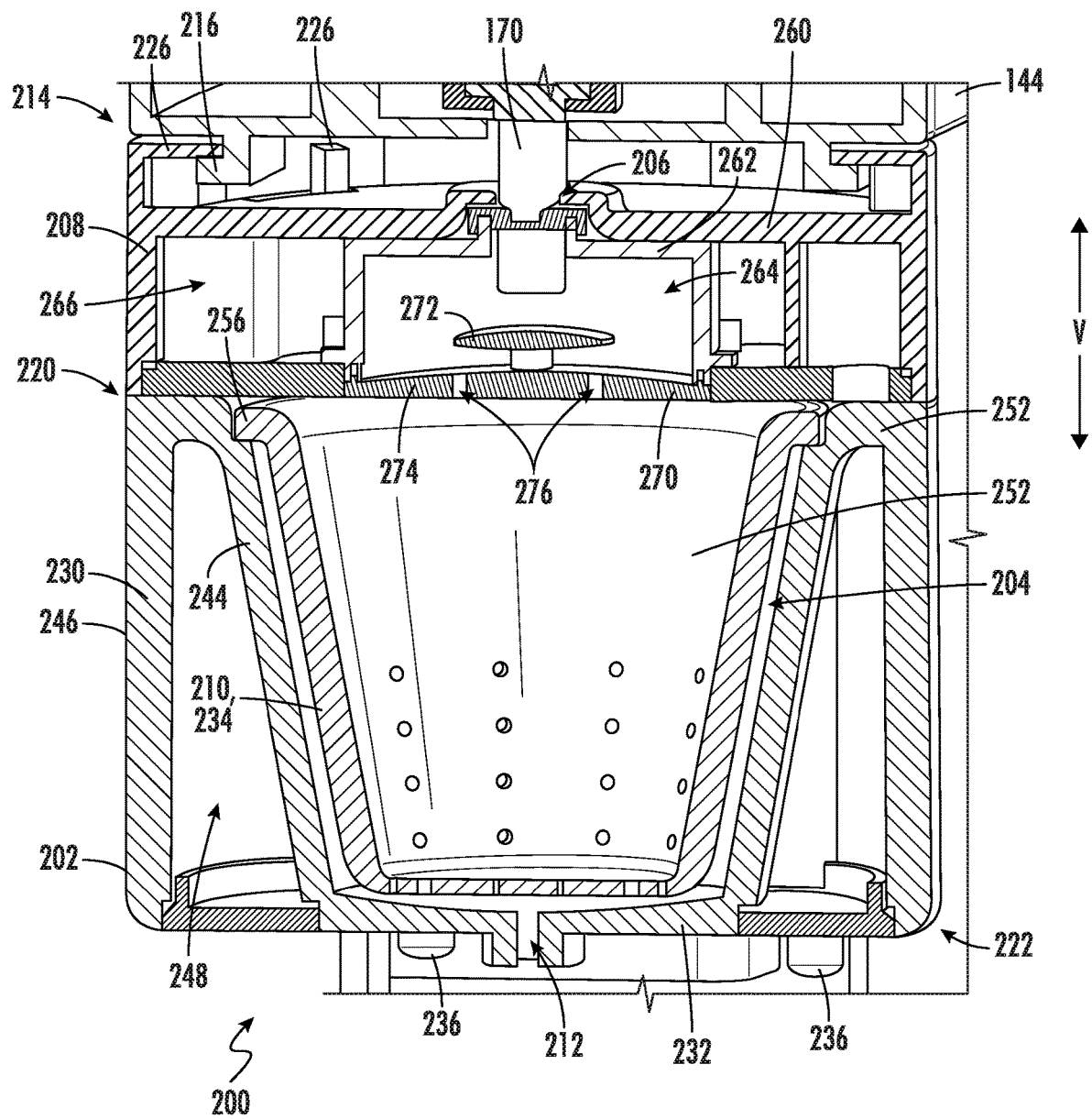
FIG. 16 provides a section view of a dispensing assembly according to exemplary embodiments of the present disclosure.
Figure 17:
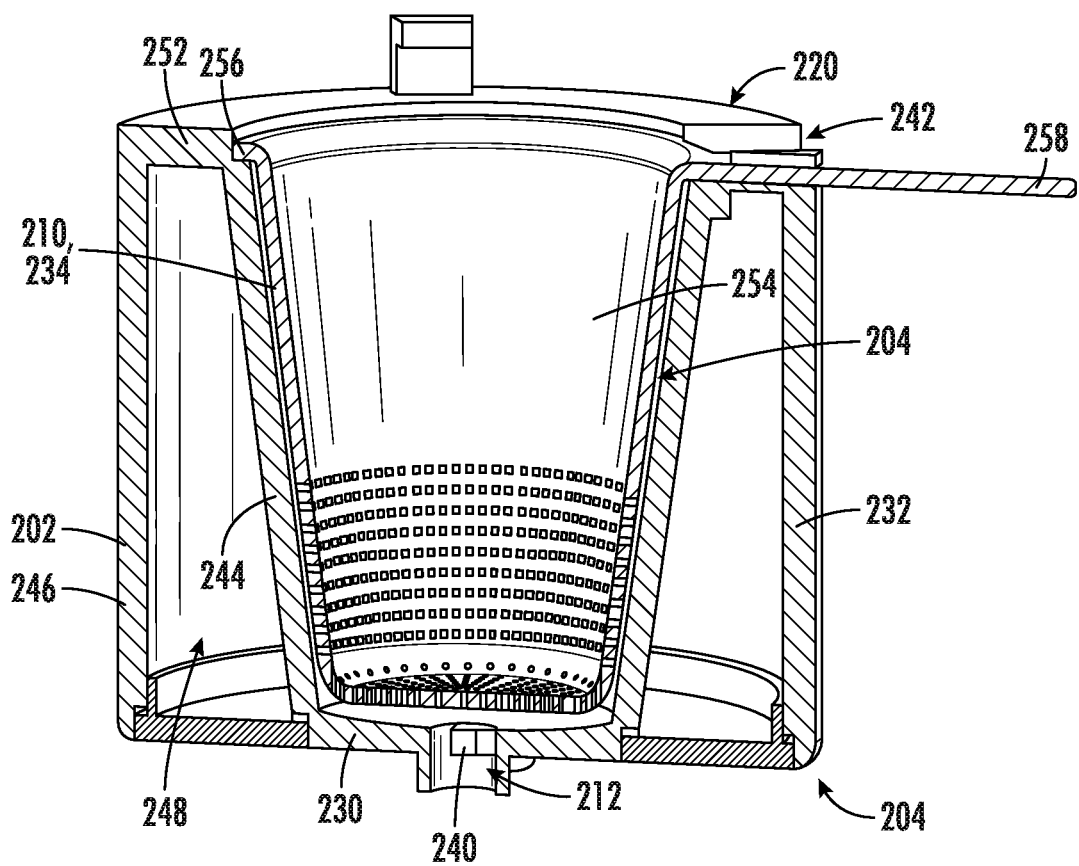
FIG. 17 provides a sectional perspective view of a brewing body and mesh cup of an exemplary brew module for use with the exemplary dispensing assembly of FIG. 2.
Figure 18:
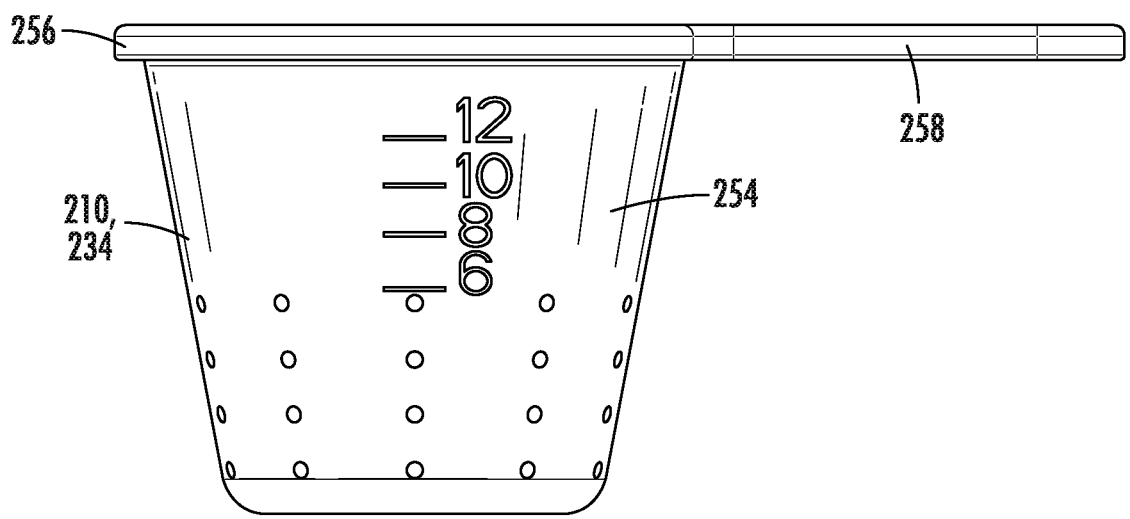
FIG. 18 provides an elevation view of the exemplary mesh cup of FIG. 17.

As illustrated in FIG. 16, dispensing assembly 140 generally includes a water conduit or delivery tube 170 for supplying heated water from the water heating assembly to dispenser 144. Optionally, water delivery tube 170 may be embodied by a moving water delivery tube. Moving water delivery tube 170 may be any suitably rigid conduit or piping that is configured for moving in a substantially vertical direction V. For instance, moving water delivery tube 170 may extend between a retracted position where it is retracted within dispenser 144 and an extended position where it protrudes downward along the vertical direction V away from dispenser 144. In certain embodiments, moving water delivery tube 170 is a vertically oriented stainless-steel tube that extends into and provides heated water to a brew module 200. A drive assembly (not pictured), such as an electric drive motor and worm gear, may be provided, to move water delivery tube 170.

Figure 3:
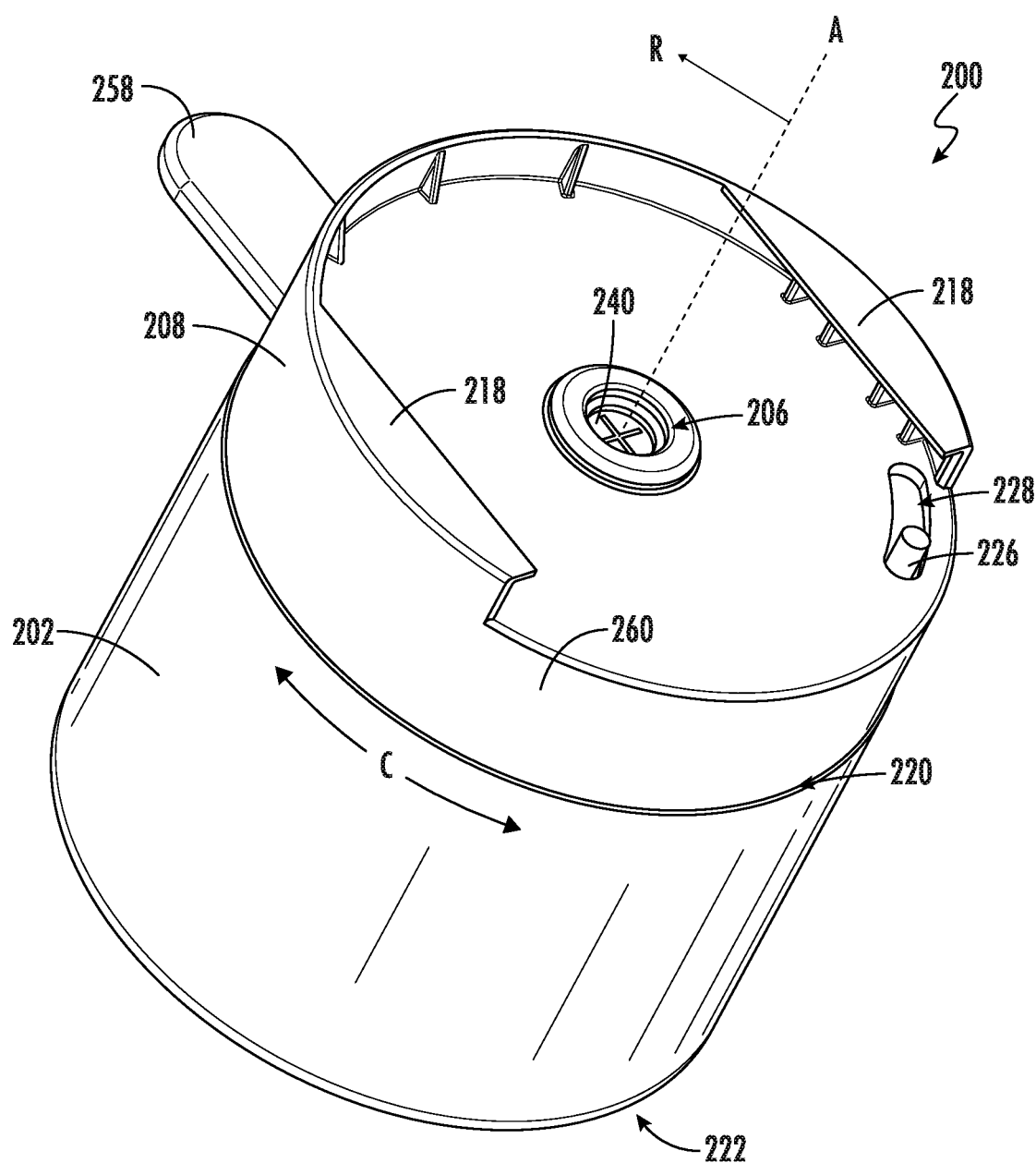
FIG. 3 provides a perspective view of an exemplary brew module for use with the exemplary dispensing assembly of FIG. 2, wherein a lid is shown in a first position.
Figure 4:
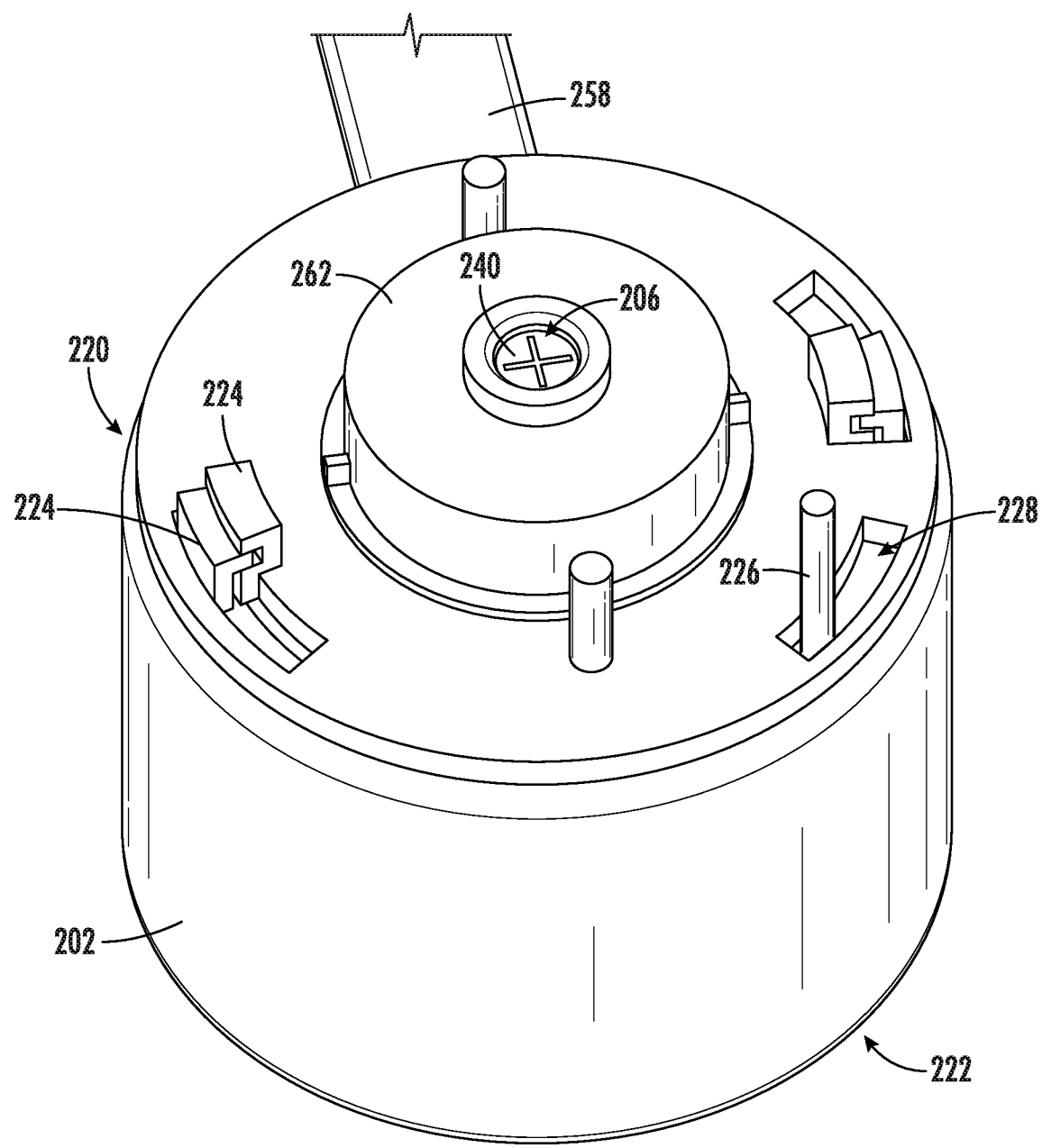
FIG. 4 provides a perspective view of the exemplary brew module of FIG. 3, wherein a portion of the lid is removed for clarity.

Referring generally to FIGS. 2, 3, and 16, dispensing assembly 140 includes a brew module 200 according to exemplary embodiments of the present subject matter. Generally, brew module 200 is mountable within dispenser recess 142 such that brew module 200 can be in fluid communication with water delivery tube 170 when mounted within dispenser recess 142. For example, when brew module 200 is installed in dispenser 144, an inlet 206 defined through a lid 208 above a brewing body 202 is in vertical alignment with the water delivery tube 170. Dispenser 144 may be configured for extending water delivery tube 170 downward along the vertical direction V such that water delivery tube 170 is received into inlet 206. During use, heated water from the water heating assembly may flow into brew module 200 via water delivery tube 170 at inlet 206. Within brew module 200, heated water may mix with, dissolve, or extract portions of a particulate material (e.g., held in a brew pod 210) to form a liquid beverage (e.g., a liquid coffee or tea solution), which may then exit brew module 200 through an outlet 212 defined through brewing body 202.

Referring now generally to FIGS. 3 through 16, brew module 200 may include a body 202 that defines a brew chamber 204. Brew chamber 204 may be a substantially cylindrical chamber that is configured to receive a brew pod 210 (e.g., sealed, disposable cup or reusable mesh cup 234). A lid 208 can be rotatably attached to brewing body 202 and selectively removed to permit selective access to brew chamber 204. More specifically, lid 208 may be rotated onto brewing body 202 about a rotation axis A defined by brewing body 202, as described in detail below.

Turning especially to FIGS. 3 through 9, appliance 100 may include a slide joint 214 formed between dispenser 144 and lid 208. For example, dispenser 144 may define one or more flanges 216 that extend down from an upper wall of dispenser 144 to receive one or more corresponding rails 218 disposed on brew module 200. In particular, such rails 218 may be disposed on lid 208 (e.g., at a top portion thereof). When brew module 200 is connected to dispenser 144, rails 218 may support brew module 200 on dispenser 144. Moreover, rails 218 (e.g., with flanges 216) may define a slide path P along which brew module 200 moves. Thus, when connecting or removing brew module 200 to/from dispenser 144, rails 218 may follow the slide path P to slide on the corresponding flanges 216 (e.g., horizontally).

Figure 5:
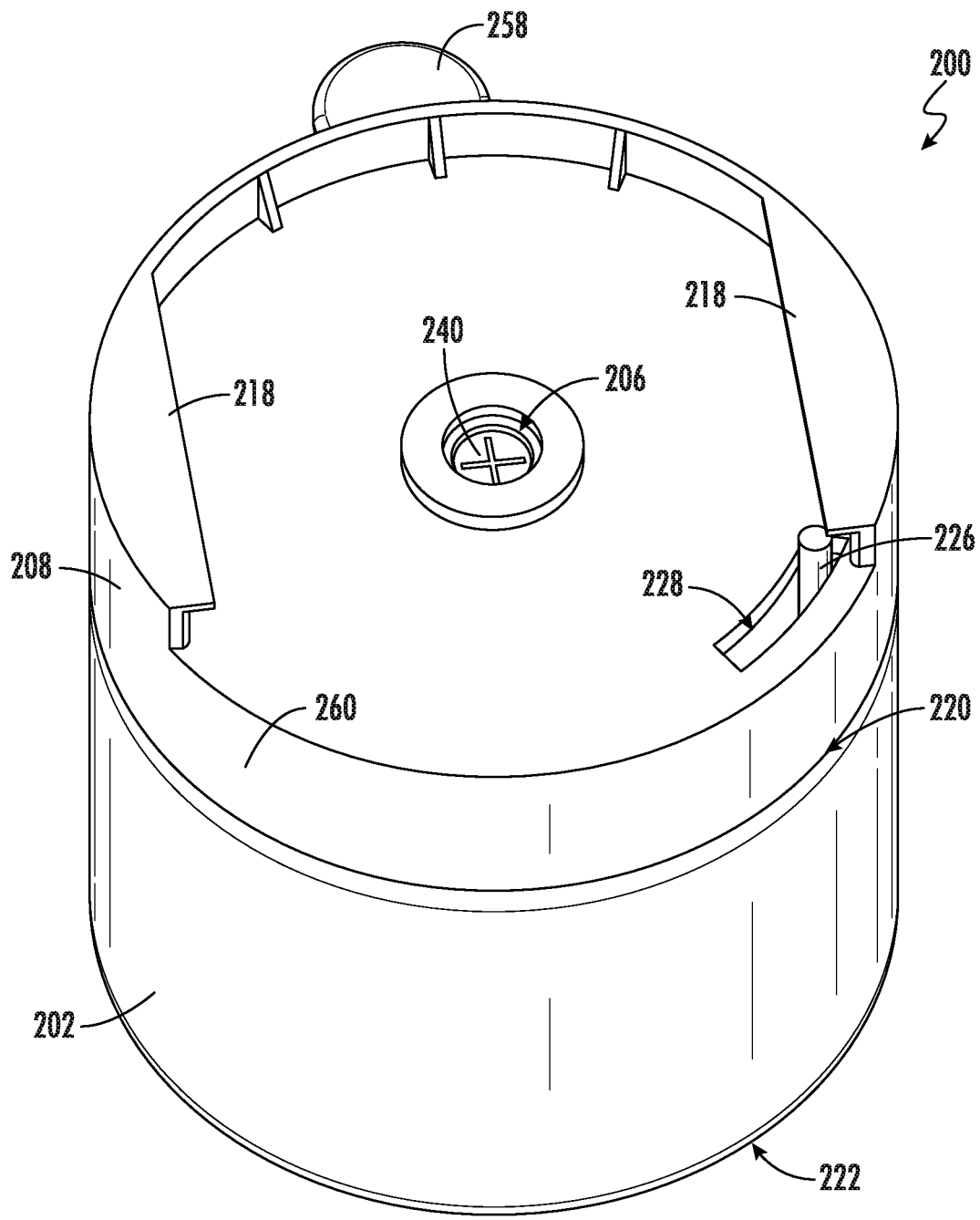
FIG. 5 provides a perspective view of the exemplary brew module of FIG. 3, wherein the lid is shown in a second position.
Figure 6:
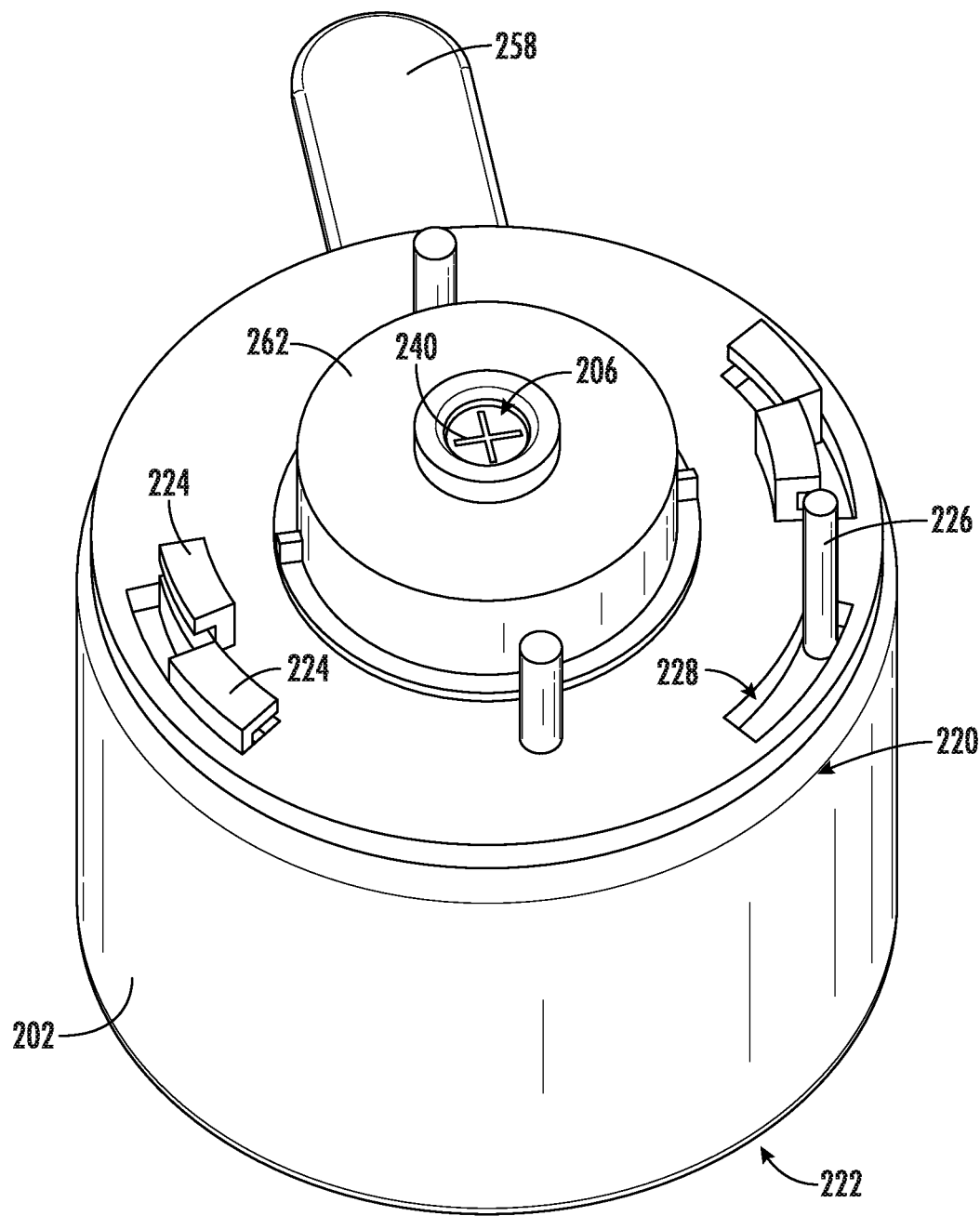
FIG. 6 provides a perspective view of the exemplary brew module of FIG. 5, wherein a portion of the lid is removed for clarity.
Figure 7:
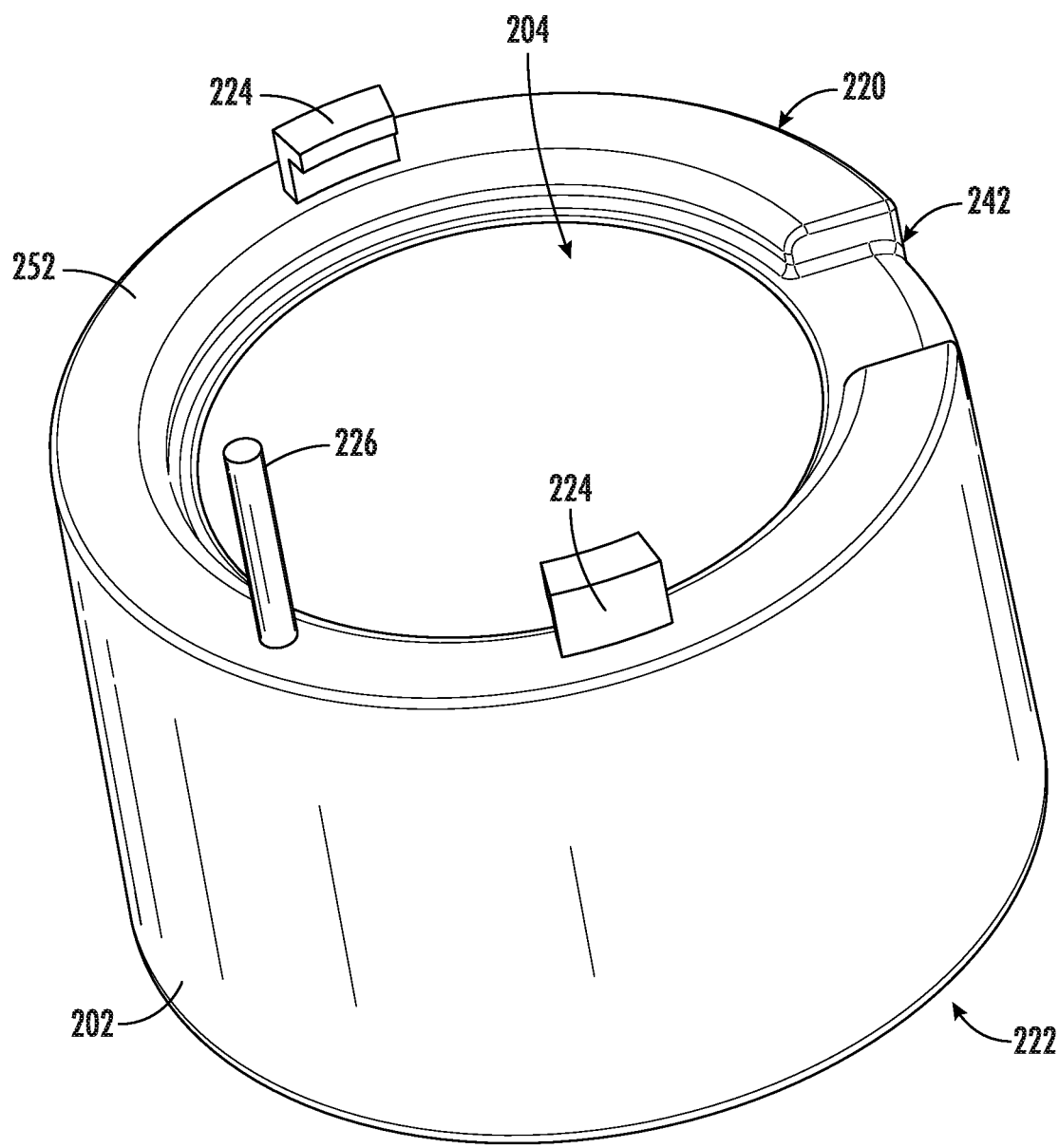
FIG. 7 provides a perspective view of a portion of the exemplary brew module of FIG. 3.
Figure 8:
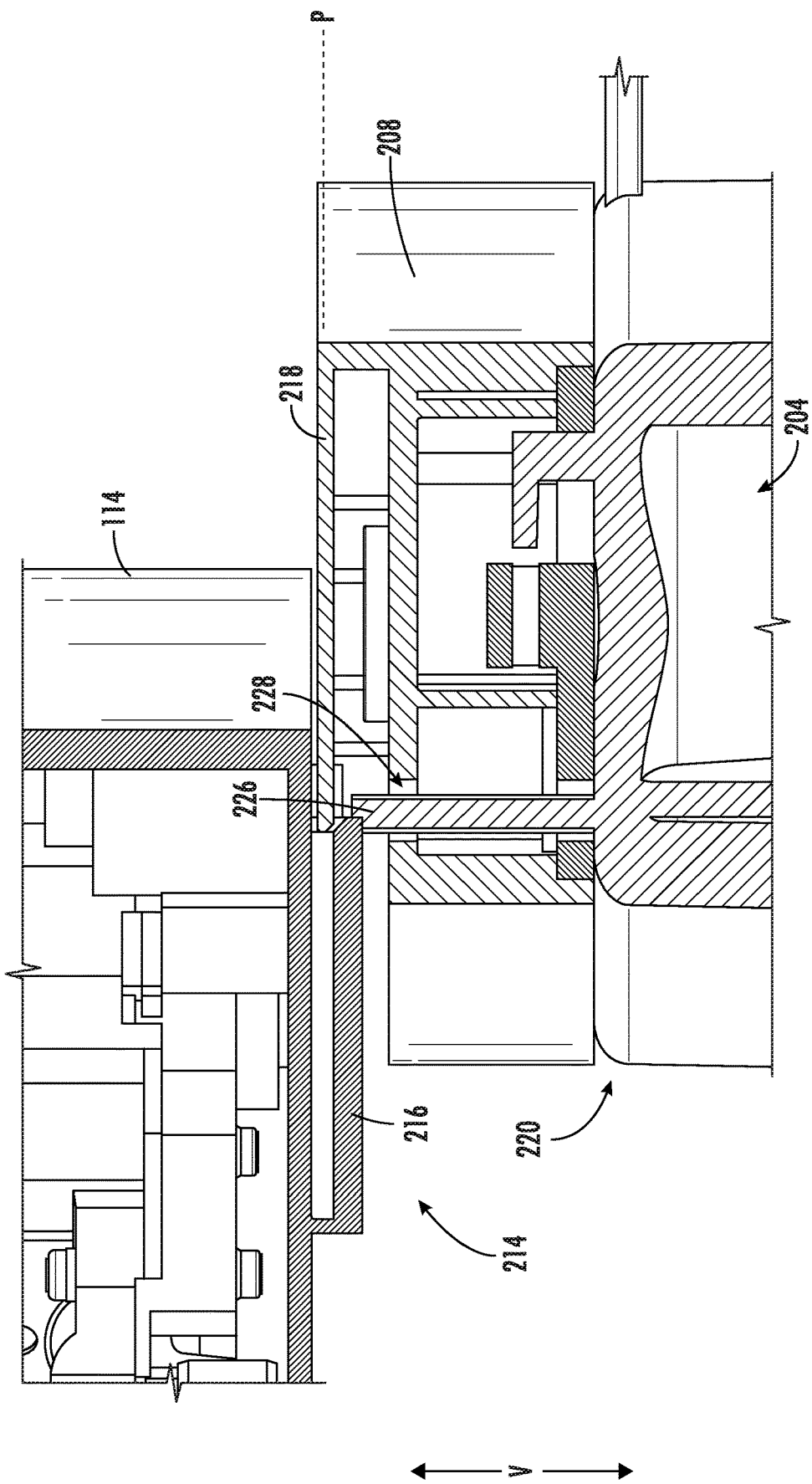
FIG. 8 provides a sectional elevation view of a portion of an exemplary dispensing assembly, wherein the lid is in the second position.
Figure 9:
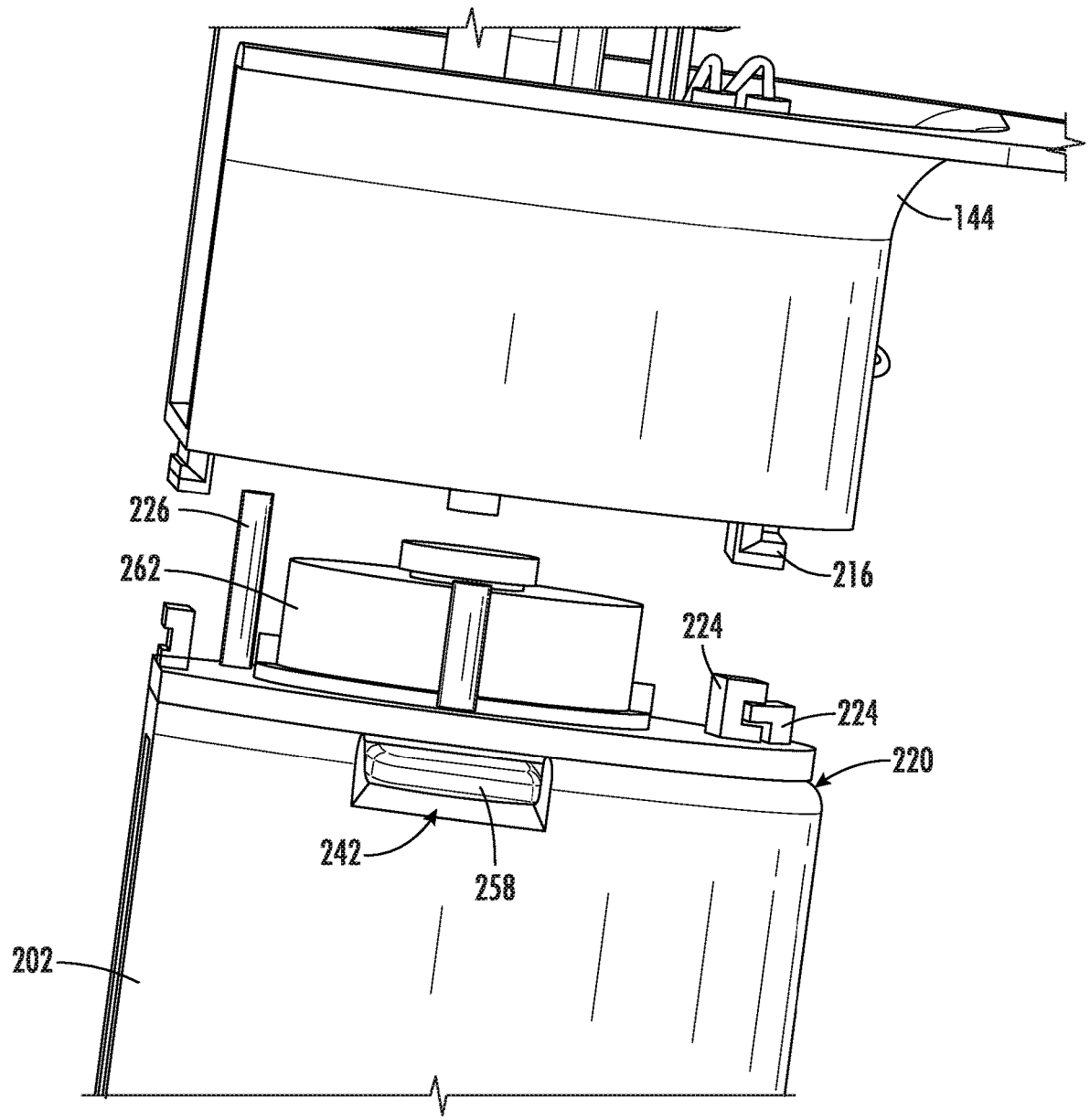
FIG. 9 provides a perspective view of a portion of an exemplary dispensing assembly, wherein a portion of the lid in the first position is removed for clarity.

When attached to brewing body 202 (e.g., apart from dispenser 144), lid 208 is rotatable about the rotation axis A between a first position (FIGS. 3, 4, and 9) and a second position (FIGS. 5, 6, and 8). In certain embodiments, one or more mating teeth 224 (e.g., matched C-shaped hooks, threads, etc.) may hold lid 208 and brewing body 202 together. For example, one or more teeth 224 extending from brewing body 202 (e.g., upward at an upper end 220 of brewing body 202) and one or more corresponding teeth 224 extending from lid 208 (e.g., downward at a lower end of lid 208) may selectively interlock together. In the exemplary embodiments, the mating teeth 224 are interlocked in circumferential alignment in the first position. Thus, the first position may restrict or prevent vertical movement of the lid 208 relative to the brewing body 202. By contrast, in the second position, the mating teeth 224 may be unengaged and circumferentially spaced apart. Thus, the second position may permit vertical movement (e.g., separation) of lid 208 relative to the brewing body 202. Advantageously, selective separation of the brewing body 202 and lid 208 may permit full access to brew chamber 204. Additionally or alternatively, thorough cleaning of brew module 200 may be notably permitted by separating brewing body 202 and lid 208 (e.g., in a repeatable manner that allows for selective reattachment of lid 208 to brewing body 202).

In some embodiments, a contact pin 226 is provided on brew module 200 to selectively interfere with the connection at slide joint 214 (e.g., when lid 108 is in the second position or otherwise not in the first position). As shown, contact pin 226 may movably disposed within a portion of the slide path P. In particular, contact pin 226 may selectively extending through the slide path P (e.g., perpendicular or nonparallel thereto adjacent to a rail 218) in the second position (or otherwise outside of the first position). By extending through the slide path P in the second position, contact pin 226 may block at least one rail 218 from sliding or moving on the corresponding flange 216. By contrast, in the first position, contact pin 226 may be spaced apart from the slide path and not extend through the same, thereby permitting slidable engagement between the corresponding rail(s) 218 and flange(s) 216.

In exemplary embodiments, contact pin 226 extends from brewing body 202. For example, contact pin 226 may extend vertically or at a non-perpendicular (e.g., parallel) angle relative to rotation axis A. In some such embodiments, contact pin 226 extends from the upper end 220 of brewing body 202. As shown, contact pin 226 may be disposed radially outward from rotation axis A. Optionally, contact pin 226 may extend from a portion or sidewall 232 of brewing body 202 that is disposed radially outward from brew chamber 204.

Figure 10:
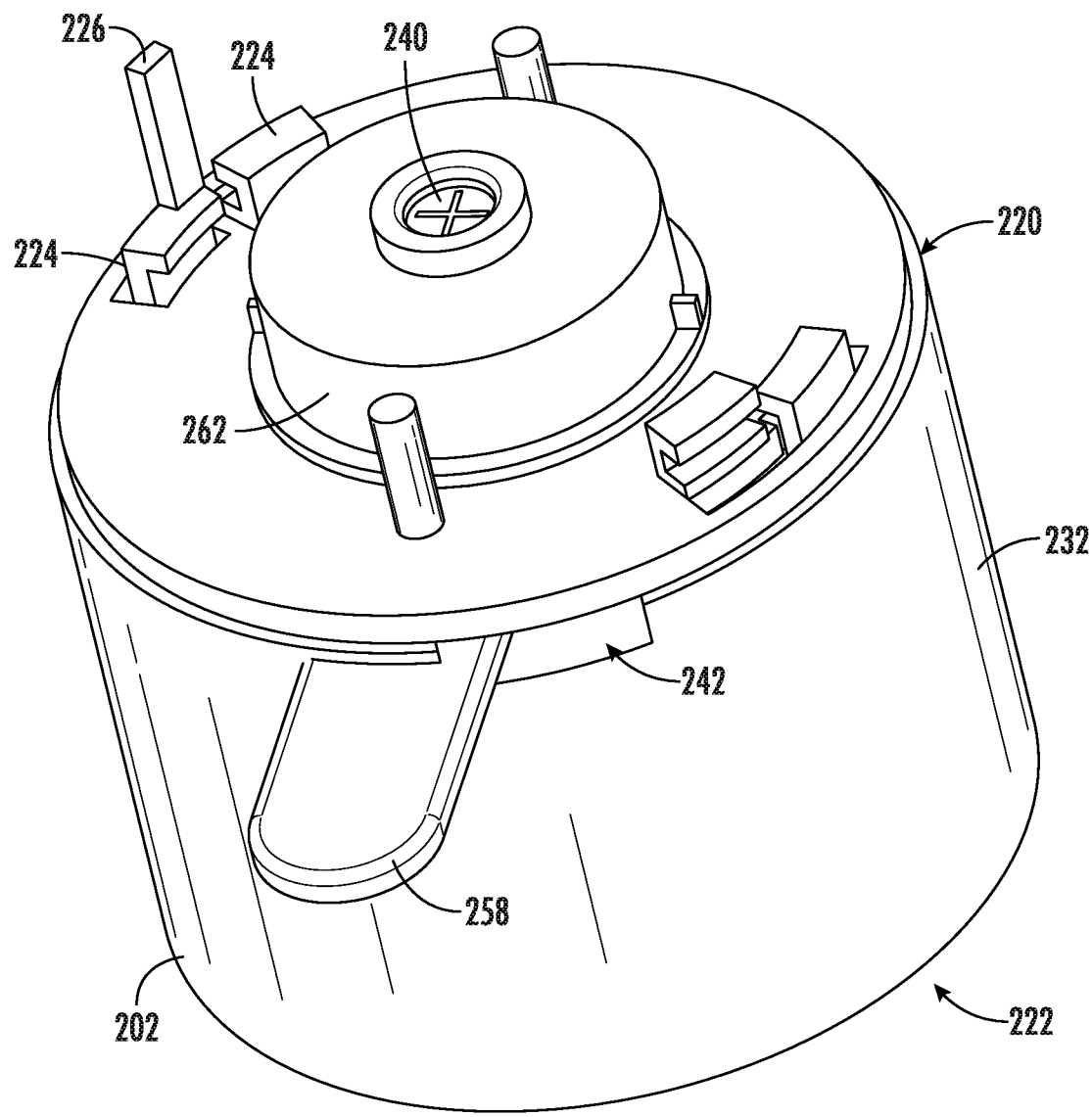
FIG. 10 provides a perspective view of an exemplary brew module for use with the exemplary dispensing assembly of FIG. 2, wherein a portion of a lid in the second position is removed for clarity.
Figure 11:
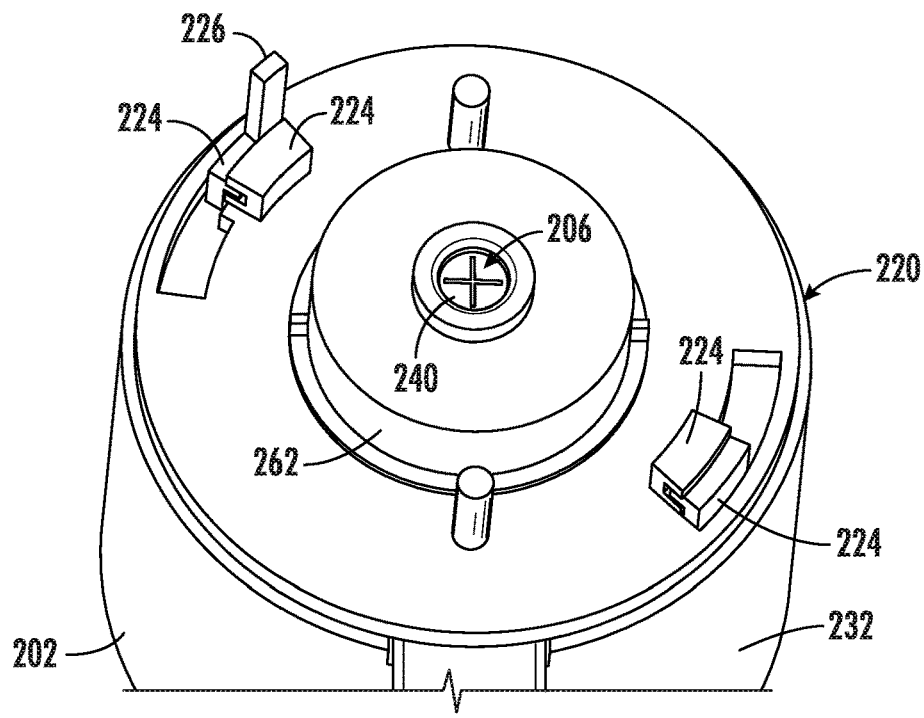
FIG. 11 provides a perspective view of the exemplary brew module of FIG. 10, wherein a portion of the lid in the first position is removed for clarity.
Figure 12:
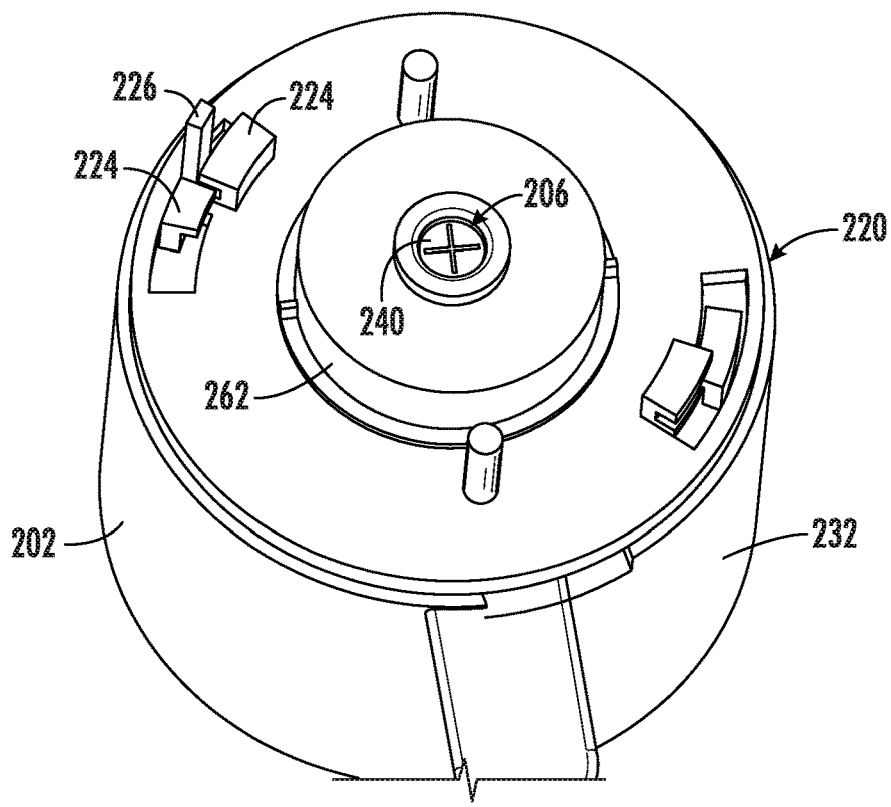
FIG. 12 provides a perspective view of the exemplary brew module of FIG. 10, wherein a portion of the lid in the second position is removed for clarity.
Figure 13:
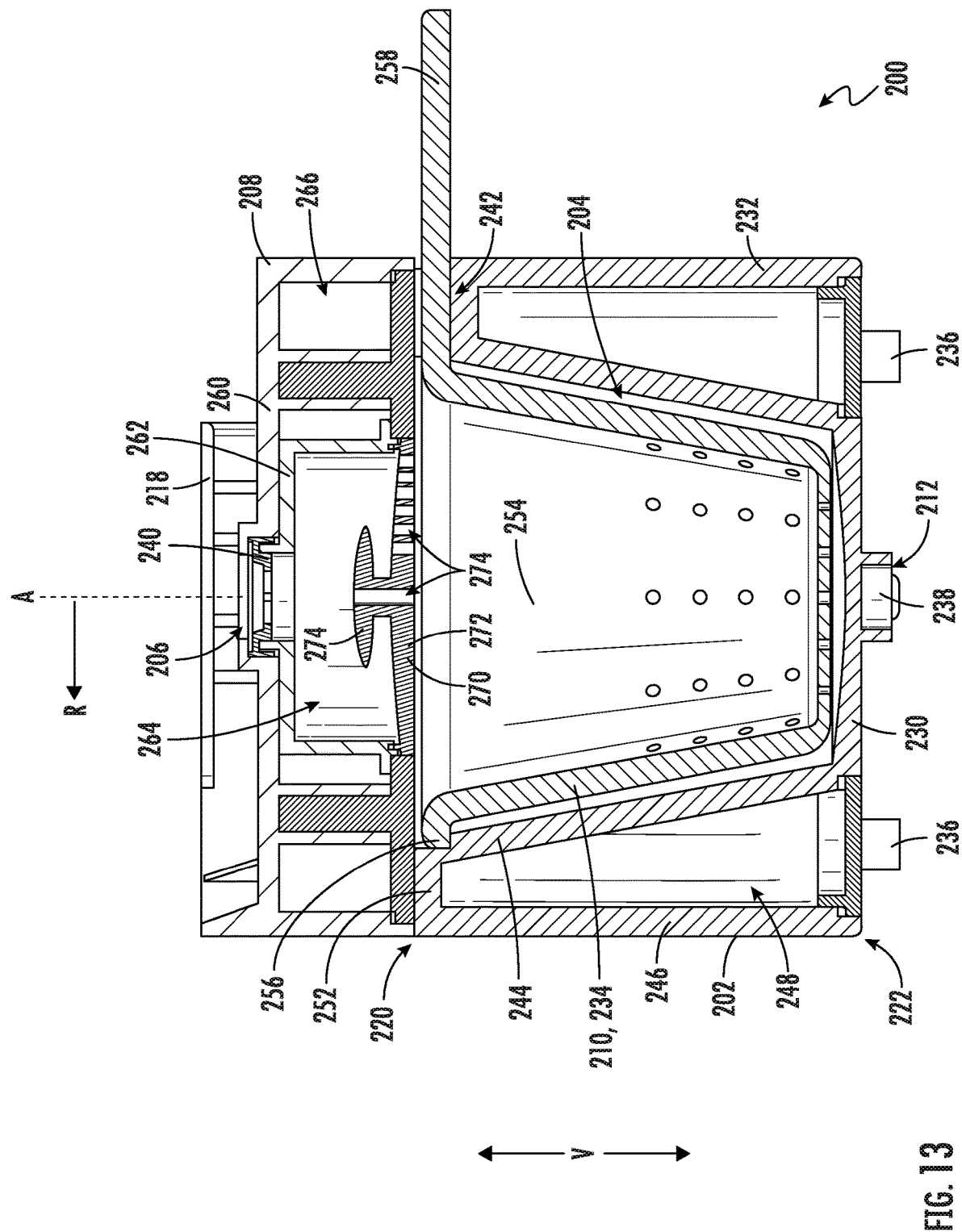
FIG. 13 provides a sectional elevation view of an exemplary brew module for use with the exemplary dispensing assembly of FIG. 2.
Figure 14:
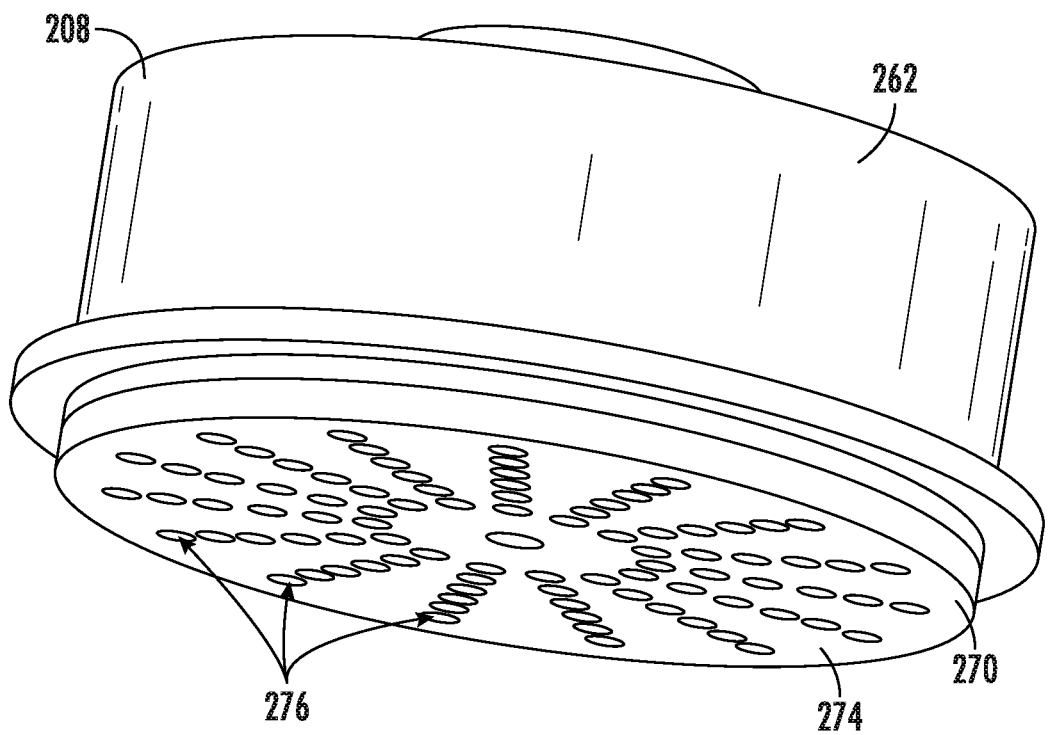
FIG. 14 provides a perspective view of a sub-chamber portion of the lid of the exemplary brew module of FIG. 13.
Figure 15:
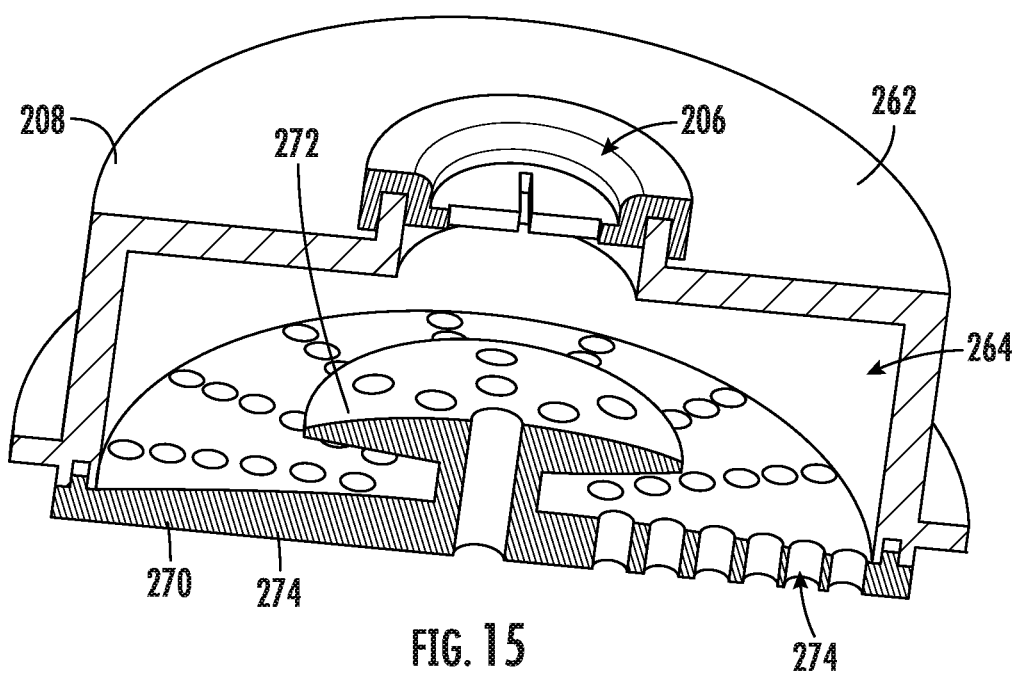
FIG. 15 provides a sectional perspective view of a sub-chamber portion of the lid of the exemplary brew module of FIG. 13.

As illustrated in FIGS. 3 through 9, contact pin 226 may be circumferentially offset from the mating teeth 224 of brewing body 202. Nonetheless, as illustrated in FIGS. 10 through 12, alternative embodiments may include contact pin 226 in circumferential alignment (e.g., at the same circumferential position on brewing body 202) with at least one of the mating teeth 224 of brewing body 202. For instance, contact pin 226 may extend directly from a mating tooth 224 of brewing body 202. Optionally, contact pin 226 may be formed an integral (e.g., unitary or monolithic) member with the corresponding mating tooth 224 of brewing body 202. In the second position (or any another position apart from the first position) (FIGS. 10 and 12), contact pin 226 may selectively extending through the slide path P (e.g., perpendicular or nonparallel thereto adjacent to a rail 218). By contrast, in the first position (FIG. 11), contact pin 226 may be spaced apart from the slide path and not extend through the same, thereby permitting slidable engagement between the corresponding rail(s) 218 and flange(s) 216.

Returning generally to FIGS. 3 through 9, when assembled, contact pin 226 may extend through at least a portion of lid 208. In particular, lid 208 may define a pin aperture 228 through which contact pin 226 extends. As shown, contact pin 226 may thus be extended above at least a portion of rail 218 (e.g., in the second position). In some embodiments, pin aperture 228 permits circumferential movement or rotation of contact pin 226 therein. Optionally, pin aperture 228 may extend from a first circumferential point to a second circumferential point which in turn may engage contact pin 226 at the first position and the second position, respectively. Thus, pin aperture 228 may define or dictate first position or second position, at least in part.

Advantageously, the presently disclosed brew module 200 may be physically prevented from connecting to appliance 100 if or when (i.e., in response to) lid 208 is not fully secured (or otherwise in a predetermined desirable position) on brewing body 202.

Turning especially to FIGS. 3, 7, 13, and 16, portions of brewing body 202 are illustrated. As shown, brewing body 202 generally extends along the rotation axis A (e.g., vertically) between an upper end 220 and a lower end 222 that defines the outlet 212. Between upper end 220 and lower end 222 brew chamber 204 is defined. For instance, a bottom wall 230 and sidewall 232 of brewing body 202 may define brew chamber 204 as a generally cylindrical chamber within which a brew pod 210 (e.g., mesh cup 234) may be received. Generally, bottom wall 230 may be disposed at bottom end or otherwise proximate thereto. In some embodiments, bottom wall 230 may form a concave surface along brew chamber 204. The concave surface may, for instance, descend radially inward toward outlet 212 or rotation axis A. Additionally or alternatively, one or more support legs 236 may extend from the bottom wall 230 (e.g., opposite the brew chamber 204) at the lower end 222. When brewing body 202 or brew module 200, generally, is placed on a support surface (e.g., countertop, table, etc.) apart from appliance 100, the support legs 236 may hold outlet 212 or bottom wall 230 above the support surface.

In some embodiments, a resilient uni-directional valve 238 (e.g., silicone one-way valve) is disposed across outlet 212. For instance, the resilient uni-directional valve 238 may be mounted on or within bottom wall 230. When assembled, resilient uni-directional valve 238 may prevent fluid flow through outlet 212 to brew chamber 204. In other words, resilient uni-directional valve 238 may direct the flow of liquid through outlet 212 downstream from brew chamber 204 while preventing a reverse flow of liquid into brew module 200 through the outlet 212. Moreover, resilient uni-directional valve 238 may be configured with a preset pressure threshold, as would be understood, to release liquid from brew chamber 204. After a liquid (e.g., beverage) is evacuated from brew chamber 204, residual volumes may be prevented from dripping from outlet 212.

Sidewall 232 may extend above bottom wall 230 (e.g., to upper end 220) about brew chamber 204. Thus, sidewall 232 may define an opening to brew chamber 204 at upper end 220 through which at least a portion of brew pod 210 may be received. Optionally, an upper notch 242 may be defined as a vertical or axial recess through sidewall 232 at upper end 220. Thus, upper notch 242 may extend through sidewall 232 to form, for instance, a U-shaped radial gap in the sidewall 232 at upper end 220.

In some embodiments, sidewall 232 includes an interior wall 244 and exterior wall 246 radially spaced apart from interior wall 244. For example, one or more intermediate rim 252s may radially join interior wall 244 and exterior wall 246 (e.g., at upper end 220 or lower end 222). Optionally, an insulation gap 248 may be defined between the interior wall 244 and exterior wall 246. Thus, interior wall 244 and exterior wall 246 may radially bound insulation gap 248. Intermediate rim(s) 252 may further axially bound insulation gap 248 (e.g., while extending radially between interior wall 244 and exterior wall 246).

Turning especially to FIGS. 13 and 16 through 18, various portions of brew module 200 are illustrated. In particular, a brew pod 210 comprising a mesh cup 234 is shown. Generally, mesh cup 234 may be selectively received within brew chamber 204. Thus, mesh cup 234 may sized smaller than at least a portion of brew chamber 204 (e.g., at interior wall 244). As shown, mesh cup 234 may include a concave scoop 254. Multiple apertures or holes defined through mesh cup 234 may be sufficiently sized to retain particulate (e.g., coffee grounds, tea leaves, etc.) within mesh cup 234 while still permitting liquid therethrough, as would be understood. Optionally, mesh cup 234 may have a radial rim 256 that holds mesh cup 234 (e.g., on sidewall 232) within brew chamber 204 such that a lowermost surface of mesh cup 234 is spaced apart from an inner surface of bottom wall 230. Thus, mesh cup 234 may be held above bottom wall 230. Additionally or alternatively, the lowermost surface of mesh cup 234 may be defined as a flat or planar surface. A volume of liquid may thus be permitted to accumulate between mesh cup 234 and bottom wall 230 (e.g., before being dispensed through outlet 212). Opposite from the lowermost surface of mesh cup 234, mush cup may define a cup opening through which particulate or liquid (e.g., liquid water) may be received. In optional embodiments, a handle 258 extends radially outward from mesh cup 234 (e.g., at the primary opening of mesh cup 234, such as would be defined at a top end of mesh cup 234). When assembled such that mesh cup 234 is received within brew chamber 204, handle 258 may extend through sidewall 232 (e.g., at notch 242, which may be sized to match handle 258) and to a region outside of brewing body 202, even when lid 208 is attached to brewing body 202.

Turning now to FIGS. 13 through 16, various portions of brew module 200 are illustrated. In particular, portions of lid 208 are shown. As noted above, lid 208 may be selectively attached to brewing body 202. Moreover, lid 208 defines an inlet 206 above and upstream from brew chamber 204. During use, liquid (e.g., heated water) may thus be provided to brew chamber 204 through inlet 206 (e.g., from water delivery tube 170).

In some embodiments, a resilient uni-directional valve 240 (e.g., silicone one-way valve) is disposed across inlet 206. For instance, the resilient uni-directional valve 240 may be mounted on or within an upper external wall 260 of lid 208. When assembled, resilient uni-directional valve 240 may prevent fluid flow through inlet 206 from brew chamber 204. In other words, resilient uni-directional valve 240 may direct the flow of liquid downstream through inlet 206 to brew chamber 204 while preventing a reverse flow of liquid out of the brew module 200 through the inlet 206. Moreover, resilient uni-directional valve 240 may be configured with a preset pressure threshold, as would be understood, to open access brew chamber 204. After water dispensing tube 170 is removed from lid 208, residual volumes may be prevented from dripping into or from inlet 206.

In certain embodiments, lid 208 defines a sealed sub-chamber 264 below or downstream from inlet 206 to hold a volume of liquid (e.g., water) above or upstream from brew chamber 204. During use, liquid may thus accumulate within sealed sub-chamber 264 (e.g., from water dispensing tube 170) prior to being permitted to brew chamber 204. When assembled, sealed sub-chamber 264 may be axially aligned or disposed directly above brew chamber 204. An internal wall 262 of lid 208 may define sealed sub-chamber 264. Additionally or alternatively, internal wall 262 may be enclosed by an external wall 260. Optionally, internal wall 262 may be nested within external wall 260. In some such embodiments, internal wall 262 is radially and axially bounded (e.g., from above) by external wall 260. An outer sub-chamber 266 may be defined between external wall 260 and internal wall 262 (e.g., in fluid isolation from inlet 206). Advantageously, heated water may be focused to brew chamber 204 while splatter or disruption of particulate from brew chamber 204 may be prevented.

In additional or alternative embodiments, a distributor plate 270 is provided between inlet 206 and brew chamber 204. For example, distributor plate 270 may be mounted within lid 208 (e.g., inside or directly below sealed sub-chamber 264). As shown, distributor plate 270 may include a dispersion head 272 and a base platform 274. When assembled, base platform 274 may extend across an opening to brew chamber 204 (e.g., defined by lid 208). Dispersion head 272 may extend above base platform 274. Optionally, dispersion head 272 may be axially aligned with inlet 206 or brew chamber 204. In certain embodiments, dispersion head 272 provides a concave guiding surface. Base platform 274 may extend (e.g., radially) outward from dispersion head 272.

Distributor plate 270 generally defines a plurality of plate apertures 276 that extend (e.g., vertically or axially) through distributor plate 270 and through which water may be permitted to flow (e.g., from lid 208 or sealed sub-chamber 264) to brew chamber 204. Specifically, a plurality of radially spaced plate apertures 276 are defined by base platform 274 to permit water (e.g., from the dispersion head 272 or water dispensing tube 170) to the brew chamber 204. Optionally, one or more additional plate apertures 276 may be defined by dispersion head 272 to permit water therethrough to brew chamber 204.

During use, dispersion head 272 may serve to deflect or slow the flow of water to base platform 274 and brew chamber 204. Moreover, flowing water may be distributed across an increased area of brew chamber 204. Advantageously, liquid or water to brew chamber 204 may be evenly flowed to particulate within brew pod 210 in a controlled manner. Additionally or alternatively, particulate may be prevented from being dislodged from brew chamber 204 and, for example, being forced into lid 208.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A beverage dispensing assembly for use with an appliance, the beverage dispensing assembly defining a rotation axis and comprising:
   a brewing body defining a brew chamber to receive a brew pod, the brewing body extending along the rotation axis between an upper end and a lower end, the brewing body defining an outlet at the lower end;
   a lid rotatably attached to the brewing body at the upper end to rotate about the rotation axis between a first position and a second position, the first position securing the lid to the brewing body and restricting access to the brew chamber, the second position releasing the lid from the brewing body;
   a rail disposed on the lid to support the beverage dispensing assembly on the appliance, the rail defining a slide path along which the beverage dispensing assembly may slide along the appliance; and a contact pin selectively extending through the slide path in the second position to prevent attachment of the beverage dispensing assembly to the appliance.

2. The beverage dispensing assembly of claim 1, wherein the contact pin extends from the brewing body and through the lid to extend thereabove in the second position.

3. The beverage dispensing assembly of claim 1, wherein the lid defines an inlet above the brew chamber and a sealed sub-chamber downstream from the inlet to hold a volume of liquid upstream from the brew chamber.

4. The beverage dispensing assembly of claim 1, wherein the lid defines an inlet above the brew chamber, and wherein the beverage dispensing assembly further comprises a resilient uni-directional valve disposed across the inlet to prevent a reverse flow of liquid from the brewing body through the inlet.

5. The beverage dispensing assembly of claim 1, further comprising a resilient uni-directional valve disposed across the outlet to prevent a reverse flow of liquid into the beverage dispensing assembly through the outlet.

6. The beverage dispensing assembly of claim 1, wherein the brewing body comprises one or more support legs extending from the lower end parallel to the rotation axis to hold the outlet above a support surface apart from the appliance.

7. The beverage dispensing assembly of claim 1, further comprising the brew pod, wherein the brew pod comprises a mesh cup selectively received within the brew chamber.

8. The beverage dispensing assembly of claim 7, wherein the brewing body comprises a bottom wall and a sidewall disposed about the brew chamber, wherein the mesh cup is held above the bottom wall.

9. The beverage dispensing assembly of claim 8, wherein the brewing body comprises a bottom wall and a sidewall disposed about the brew chamber, and wherein the mesh cup comprises a concave scoop and a handle extending radially from the concave scoop through the sidewall.

10. A beverage dispensing assembly for use with an appliance, the beverage dispensing assembly defining a rotation axis and comprising:

a brewing body defining a brew chamber to receive a brew pod, the brewing body extending along the rotation axis between an upper end and a lower end, the brewing body defining an outlet at the lower end;

a lid defining an inlet to receive a water conduit, the lid being rotatably attached to the brewing body at the upper end to rotate about the rotation axis between a first position and a second position, the first position securing the lid to the brewing body and restricting access to the brew chamber, the second position releasing the lid from the brewing body; and a distributor plate disposed between the inlet and the brew chamber, the distributor plate defining a plurality of apertures to permit water to the brew chamber, the distributor plate comprising a dispersion head and a base platform, the dispersion head being disposed above the base platform to deflect water from the water conduit to the base platform, and the base platform defining a plurality of radially spaced apertures to permit water from the dispersion head to the brew chamber.

11. The beverage dispensing assembly of claim 10, further comprising a contact pin, wherein the contact pin extends from the brewing body and through the lid to extend thereabove in the second position.

12. The beverage dispensing assembly of claim 10, wherein the lid defines a sealed sub-chamber downstream from the inlet to hold a volume of liquid upstream from the brew chamber.

13. The beverage dispensing assembly of claim 10, wherein the beverage dispensing assembly further comprises a resilient uni-directional valve disposed across the inlet to prevent a reverse flow of liquid from the brewing body through the inlet.

14. The beverage dispensing assembly of claim 10, further comprising a resilient uni-directional valve disposed across the outlet to prevent a reverse flow of liquid into the beverage dispensing assembly through the outlet.

15. The beverage dispensing assembly of claim 10, wherein the brewing body comprises one or more support legs extending from the lower end parallel to the rotation axis to hold the outlet above a support surface apart from the appliance.

16. The beverage dispensing assembly of claim 10, further comprising the brew pod, wherein the brew pod comprises a mesh cup selectively received within the brew chamber.

17. The beverage dispensing assembly of claim 16, wherein the brewing body comprises a bottom wall and a sidewall disposed about the brew chamber, wherein the mesh cup is held above the bottom wall.

18. The beverage dispensing assembly of claim 17, wherein the brewing body comprises a bottom wall and a sidewall disposed about the brew chamber, and wherein the mesh cup comprises a concave scoop and a handle extending radially from the concave scoop through the sidewall.

* * * * *